United States Patent [19]

Tsay

[11] Patent Number: 4,899,721
[45] Date of Patent: Feb. 13, 1990

[54] CHARCOAL STOVE CASING SET

[76] Inventor: Yung-Lang Tsay, Suite A, 9th Floor, No. 290, Ying Tsair Rd., Taichung, Taiwan

[21] Appl. No.: 330,635

[22] Filed: Mar. 30, 1989

[51] Int. Cl.⁴ .............................................. F24B 3/00
[52] U.S. Cl. .................................. 126/25 B; 126/9 A; 44/42; 44/541
[58] Field of Search ............ 126/9 R, 9 A, 9 B, 25 R, 126/25 B, 25 A, 283; 44/534, 541, 533, 42

[56] References Cited

U.S. PATENT DOCUMENTS

| | | | |
|---|---|---|---|
| 1,959,473 | 5/1934 | Heron | 126/25 R |
| 2,531,828 | 11/1950 | Schultz | 126/9 A |
| 2,584,040 | 1/1952 | Naranick | 126/9 A |
| 2,666,695 | 1/1954 | Brody | 126/25 B |
| 4,762,525 | 8/1988 | Wood | 126/9 A |
| 4,786,290 | 11/1988 | Wyer | 44/541 |
| 4,793,320 | 12/1988 | Bakic | 126/9 A |

Primary Examiner—James C. Yeung
Attorney, Agent, or Firm—Bacon & Thomas

[57] ABSTRACT

A charcoal stove casing set including a presspaper casing provided with a solid alcohol trough and a match stick fire striking assembly, the casing having an inner space for receiving a mixture of charcoal chips, wood flour and black earth formed with a plurality of vent holes communicating with a bottom groove disposed to receive the alcohol trough, the vent holes and bottom groove providing air circulation for supporting combustion.

3 Claims, 4 Drawing Sheets

CHARCOAL STOVE CASING SET

BACKGROUND OF THE INVENTION

The present invention is to provide a charcoal stove casing set which is adapted for preparation of barbecue or for cooking out during outdoor camping or other outdoor activities and which is also very practical for household fireplace application.

Regular portable baking stoves are normally designed to use charcoal as a fuel to make a fire for roasting meat or for cooking. Therefore, it is very inconvenient to carry packages of black charcoals while cooking out, for which some participants may be unable to fully enjoy the outdoor activities.

Although regular charcoal is a combustible round rod, it is still very difficult to burn. To initially build a fire, it is more practical to knock a charcoal to pieces. While knocking a charcoal to pieces, waste charcoal chips may result from the process. While burning, the heavy smoke from the fire may irritate the throat, nose or eyes of the fire builder, who may unconsciously inhale harmful substances. Further, during roasting process, the grease dropped from either chicken meat or pork or other meat may drastically strengthen the intensity of the fire to burn the roast or the user may even suffer from a burn on the hand.

SUMMARY OF THE INVENTION

The main object of the present invention is to provide a charcoal stove casing set, wherein a charcoal mixture is incorporated with a presspaper casing and is firmly secured in the presspaper casing by means of a fixing strap integrally extended from one side of said presspaper casing so as to let the whole assembly be convenient to carry.

Another object of the present invention is to provide a charcoal stove casing set wherein a solid alcohol contained in an alcohol trough is fixedly set in the presspaper made casing, and a match stick is horizontally disposed on said solid alcohol and covered with two phosphorated boards to facilitate striking a fire.

A yet further object of the present invention is to provide a charcoal stove casing set wherein the charcoal mixture is made of charcoal chips, wood flour and black earth, which does not produce heavy smoke or burn the roast while burning.

Further objects, features and other aspects of this invention will be understood from the following detailed description of preferred embodiments of this invention with reference to the annexed drawings.

Figure 1:
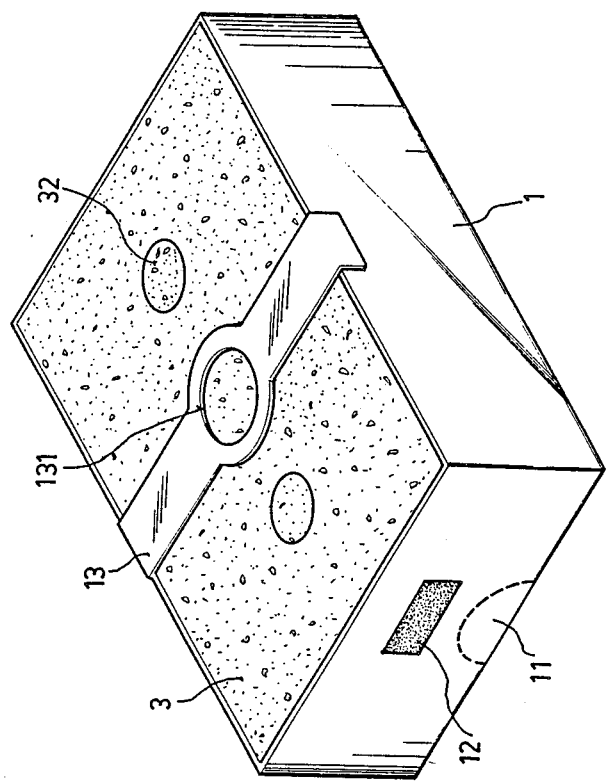
FIG. 1 is a perspective view of a charcoal stove casing set according to a preferred embodiment of the present invention.

CODES (1) presspaper frame body, paper casing
(11) tearing line
(12) phosphorated strip
(13) fixing strap
(131) ring-shaped portion
(2) solid alcohol trough
(21) phosphorated inner wall
(22) aluminum foil
(221) solid alcohol
(222) concavely frame body
(23) match stick
(231) head of match stick
(3) charcoal mixture
(31) (32) vent hole
(33) trough

DETAILED DESCRIPTION OF THE PREFERRED EMBODIMENTS

Figure 2:
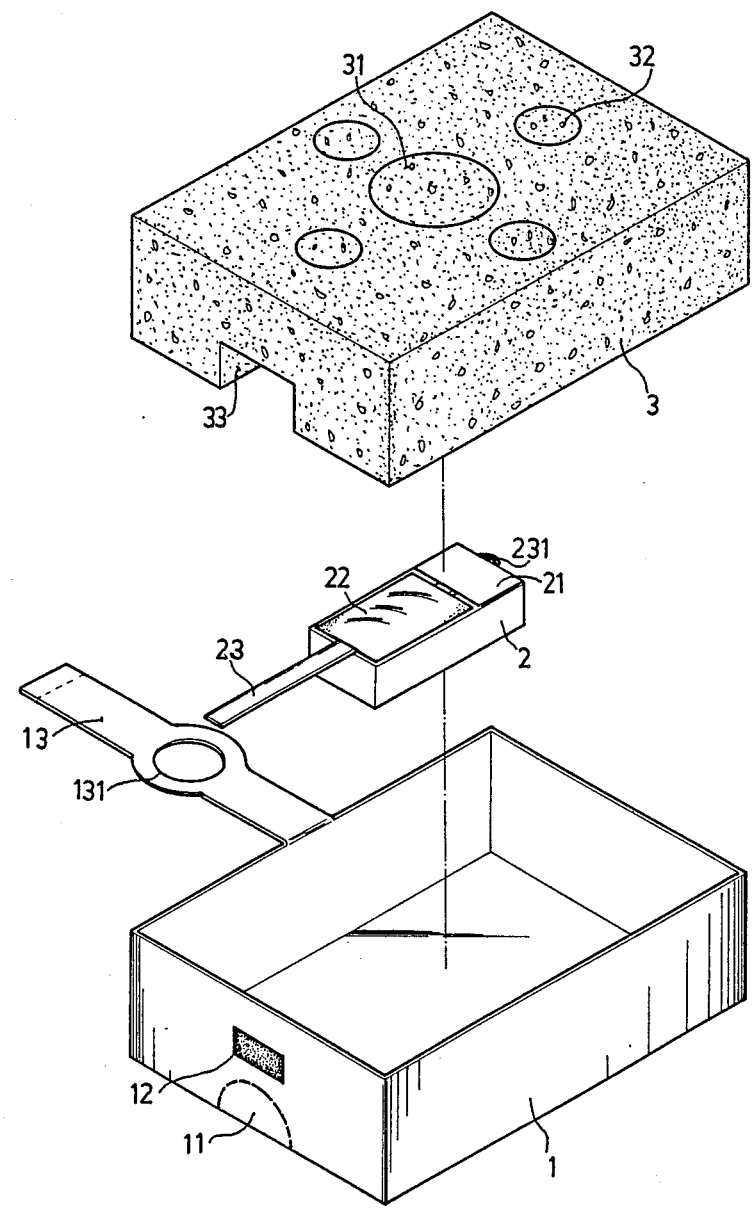
FIG. 2 is a fragmentary perspective view of the said preferred embodiment of the present invention.

Referring to FIGS. 1 through 2, a charcoal stove casing set constructed in accordance with the present invention is shown. A charcoal stove casing set is comprised of a presspaper made frame body (1), a solid alcohol trough (2), and charcoal mixture (3). The presspaper made frame body (1) is a paper casing (1), having a tearing line (11) made on the bottom edge at each end, a phosphorated strip (12) made on the end surface above a tearing line (11), and a fixing strap (13) integrally extended from one side. The fixing strap (13) comprises a ring-shaped portion (131) at the center. The solid alcohol trough (2) is fixedly set in said presspaper made frame body (1). The charcoal mixture (3) comprises a vent hole (31) on the top at the center, surrounded by a plurality of vent holes (32), and said charcoal mixture also comprises a groove (33) at the bottom for receiving said solid alcohol trough (2). When said charcoal mixture (3) is set in said paper casing (1) to contain said solid alcohol trough (2) in said groove (33), said fixing strap (13) is turned to secure to the other side of the paper casing (1) to secure said charcoal mixture (3) in said paper casing (1) as shown in FIG. 1.

Figure 3:
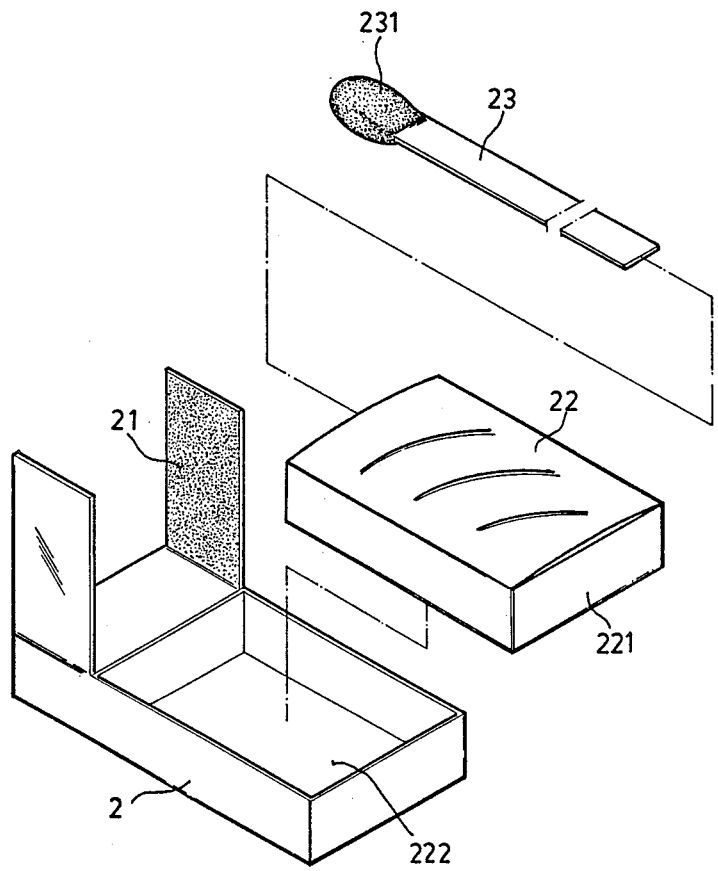
FIG. 3 is a fragmentary perspective view of the alcohol trough of the present invention.

Referring to FIG. 3, said alcohol trough (2) is a concavely frame body (222) of which the inner wall (21) of the extended side boards is covered with phosphorated material. There is provided a solid alcohol (221) wrapped with an aluminum foil (22). A match stick (23) is disposed on said solid alcohol (221) and also wrapped by said aluminum foil (22). When said solid alcohol (221) is set in said alcohol trough (2), the head (231) of said match stick (23) is horizontally disposed on the extended board and covered by said phosphorated inner wall (21) with the front end of said head of said match stick (23) slightly protruding beyond said phosphorated inner wall (21) to provide wider friction area so as to conveniently help strike the match stick (23).

Figure 4:
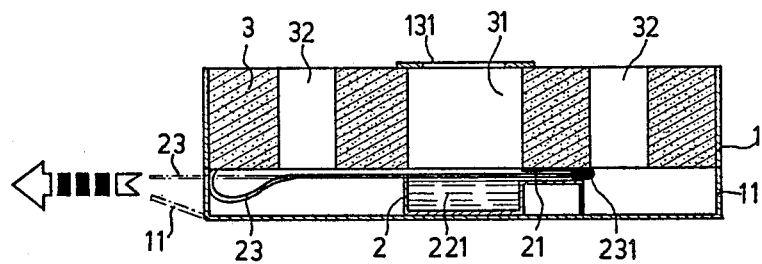
FIG. 4 is a sectional view of the alcohol trough of the present invention.
Figure 5:
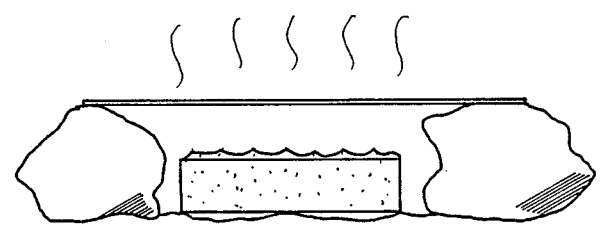
FIG. 5 is a schematic drawing, illustrating the application of the alcohol trough of the present invention.

Referring to FIGS. 4 through 5, said two tearing lines (11) disposed at both ends of said paper casing (1) are downwardly pressed to open to let said match stick (23) protrude therebeyond. When said match stick (23) is manually dragged up by force, the friction force resulted from said head (231) of said match stick (23) against said phosphorated inner wall (21) will build up a fire to burn said solid alcohol (221) and said paper casing (1) so as to further burn said charcoal mixture (3) slowly. Because said charcoal mixture (3) comprises a plurality of vent holes (31) and (32), when said two tearing lines (11) are opened, said vent holes (31) and (32) are disposed to communicate with the atmosphere through said groove (33) to facilitate circulation of air through said charcoal mixture (3) so as to help burning.

In case a fire is not created when said match stick (23) is dragged up, one may strike the head of said match stick (23) against said phosphorated strip (12) and throw the burning match stick into said vent hole (31) to burn said solid alcohol (221). When said match stick (23) is initially pulled out of said alcohol trough, said aluminum foil (22) is caused to open or to tear out. Therefore, if a burning match stick is thrown into said vent hole (31) said solid alcohol (221) is disposed for burning.

In the present invention, said charcoal mixture (3) is shape-formed through compressed pressure and most preferably consists of 65% charcoal chips by weight, 20% wood flour by weight, and 15% black earth by weight. Through said arrangement, the charcoal mixture is very practical to build a mild fire without producing heavy smoke.

In general, the present invention is to provide such a charcoal stove casing set which uses solid alcohol to practically burn a charcoal mixture, wherein said charcoal mixture comprises vent holes and bottom groove to help air circulation, and wherein said charcoal mixture is composed of charcoal chips, wood flour and black earth in a reasonable proportion, having numerous features each of which tends to make the mixture more practical to use without causing air pollution and more inexpensive to manufacture.

I claim:

1. A charcoal stove casing set comprising:
   (a) a presspaper frame body, a solid alcohol trough and a charcoal mixture;
   (b) the presspaper body being in the form of a casing defining an inner space, a tearing line formed on the bottom edges at opposed ends of the casing, a phosphorated strip positioned on one end surface of the casing above a tearing line and an integral fixing strap extending from one side of the casing;
   (c) the alcohol trough including a solid alcohol body disposed within the inner space of the casing, an aluminum foil wrapping the alcohol body, a match stick disposed between the aluminum foil and the alcohol body and including a match head wrapped by two phosphorated extension boards, with the match head extending slightly beyond the extension boards and a rear end of the match stick disposed adjacent the inner side of a tearing line;
   (d) the charcoal mixture being disposed in the inner space of the casing and including a groove, the alcohol trough being disposed within the groove; and
   (e) the fixing strap including an end attached to an opposed side of the casing for securing the charcoal mixture therein.

2. The charcoal stove casing set of claim 1 wherein the charcoal mixture further includes a plurality of vertically disposed vent holes, the bottom groove being horizontally disposed, and the charcoal mixture being formed from charcoal chips, wood flour and black earth.

3. The charcoal stove casing set of claim 1 wherein the charcoal mixture is shaped under compressive pressure and includes approximately sixty-five percent charcoal chips, twenty percent wood flour and fifteen percent black earth, by weight.

* * * * *